US009239632B2

(12) United States Patent  (10) Patent No.: US 9,239,632 B2
Cho  (45) Date of Patent: Jan. 19, 2016

(54) METHOD OF SELECTIVELY OPERATING A ROTATING FUNCTION AND PORTABLE TERMINAL SUPPORTING THE SAME

(71) Applicant: Samsung Electronics Co., Ltd., Gyeonggi-do (KR)

(72) Inventor: Youngho Cho, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 205 days.

(21) Appl. No.: 13/767,201

(22) Filed: Feb. 14, 2013

(65) Prior Publication Data

US 2013/0215054 A1    Aug. 22, 2013

(30) Foreign Application Priority Data

Feb. 17, 2012 (KR) ........................ 10-2012-0016549

(51) Int. Cl.
*G06F 3/03* (2006.01)
*G06F 3/0487* (2013.01)
*G06F 1/16* (2006.01)

(52) U.S. Cl.
CPC ............... *G06F 3/03* (2013.01); *G06F 1/1643* (2013.01); *G06F 1/1694* (2013.01); *G06F 3/0487* (2013.01)

(58) Field of Classification Search
CPC combination set(s) only.
See application file for complete search history.

(56) References Cited

U.S. PATENT DOCUMENTS

| 8,482,536 B1* | 7/2013 | Young ........................... 345/173 |
| 2008/0059888 A1* | 3/2008 | Dunko ........................... 715/744 |
| 2009/0141008 A1* | 6/2009 | Johnson et al. ................ 345/179 |
| 2009/0207184 A1* | 8/2009 | Laine et al. .................... 345/619 |
| 2009/0228820 A1* | 9/2009 | Kim et al. ...................... 715/769 |
| 2010/0222046 A1* | 9/2010 | Cumming ...................... 455/418 |
| 2010/0265269 A1* | 10/2010 | Matsuda ....................... 345/650 |
| 2011/0012926 A1* | 1/2011 | Kerr et al. ..................... 345/649 |
| 2012/0019487 A1* | 1/2012 | Kazamaki et al. ............. 345/179 |

* cited by examiner

*Primary Examiner* — Larry Sternbane
*Assistant Examiner* — Robert Michaud
(74) *Attorney, Agent, or Firm* — Cha & Reiter, LLC.

(57) ABSTRACT

A method of selectively operating a rotation function of an electronic device permits selective rotation of a display screen rotation function such that a terminal operation according to a user request may be supported while processing a user function may be performed based on the rotation function as needed. The method includes a receiving step of receiving a request to activate a specific user function, an application determination step of determining whether the rotation function applies to the specific user function of which activation is requested, a direction determining step of determining a rotation direction of a terminal when the specific user function is set to be applied with the rotation function, and an applying step of applying the rotation function to the specific user function according to the rotation direction of the terminal.

19 Claims, 5 Drawing Sheets

METHOD OF SELECTIVELY OPERATING A ROTATING FUNCTION AND PORTABLE TERMINAL SUPPORTING THE SAME

CLAIM OF PRIORITY

This application claims the benefit under 35 U.S.C. §119(a) from a Korean patent application filed on Feb. 17, 2012 in the Korean Intellectual Property Office and assigned Serial No. 10-2012-0016549, the entire disclosure of which is hereby incorporated by reference in its entirety.

BACKGROUND OF THE INVENTION

1. Field of the Invention

The present invention relates to operating a rotation function of a terminal. More particularly, the present invention relates to a method and apparatus of rotating the orientation of the display of a portable terminal.

2. Description of the Related Art

The popularity of portable terminals and their use both in various industrial fields and daily life is based in no small smart on their technological capability to support a plurality of specific user functions while being constructed with an ever-decreasing size and thickness to increase the easy of portability.

Recently, a portable terminal that integratedly supports various user functions has been constructed. Such portable terminal supports user functions while providing screens associated with each respective user function through a display unit. Accordingly, the user accesses a particular user function, while viewing a corresponding screen associated with the particular user function that is output on the display unit.

Meanwhile, a conventional portable terminal provides a function that can switch an orientation of a screen output by rotating the screen upon sensing the device has been rotated, or in the case where there is an actual keypad upon sliding out the keypad. Accordingly, the user may view the screen of the portable terminal in a vertical mode or a horizontal mode depending on a need. However, depending on the user, the user may not require a screen rotation function.

For example, a specific user may want to view a terminal screen in the vertical mode or in the horizontal mode even when the terminal was rotated. For example, the user might grip the device in a portrait position relative to his hand but still wish to see a particular object depicted in the landscape orientation. In this case, the user may set to turn off a rotation function so as not to apply the rotation function.

However, in a case where the user function provided by the terminal needs to be performed based on the rotation function, setting the device to turn off the rotation function as described above places a limitation to providing the user function in a normal manner, wherein the corresponding rotation function necessarily needs to be applied. Also, it is cumbersome for the user to go through settings to turn on or off the rotation function. Furthermore, most user's do not read through the user's manual with such detail that they even realize that the rotation function can be turned on or off.

In order to solve this problem, the terminal may be controlled to reset to turn on the rotation function; however, a rotation function setting menu requires multiple depth searches, and thus, controlling a menu setting whenever needed causes inconvenience of repeatedly performing complex multiple depth searches. Moreover, when the user does not remember where the rotation function setting menu is located, inconvenience to the user is even further increased.

SUMMARY OF THE INVENTION

The present invention has been made in part in view of the above problems, and provides a method for selectively operating a rotation function and a terminal that supports the same, in which the rotation function may be selectively operated for each user function.

In accordance with an exemplary aspect of the present invention, a method of selectively operating a rotation function of an electronic device may include: a receiving step of receiving a request to activate a specific user function, an application determination step of determining whether the rotation function applies to the specific user function of which activation is requested, a direction determining step of determining a rotation direction of a terminal when the specific user function is set to be applied with the rotation function, and an applying step of applying the rotation function to the specific user function according to the rotation direction of the terminal.

In accordance with another exemplary aspect of the present invention, a terminal for supporting selective operation of a rotation function may preferably include: a storage unit configured to store a rotation application selection list which defines whether the rotation function applies to at least one user function, a sensor unit configured to collect sensor information for supporting the rotation function, and a controller configured to identify the rotation application selection list when activation of a specific user function is requested, configured to determine a rotation direction of the terminal based on the sensor information collected by the sensor unit when a corresponding user function is set to be applied with the rotation function, and configured to apply the rotation function to the corresponding user function according to the rotation direction of the terminal.

BRIEF DESCRIPTION OF THE DRAWINGS

The exemplary objects, features and advantages of the present invention will become more apparent to a person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

Figure 1:
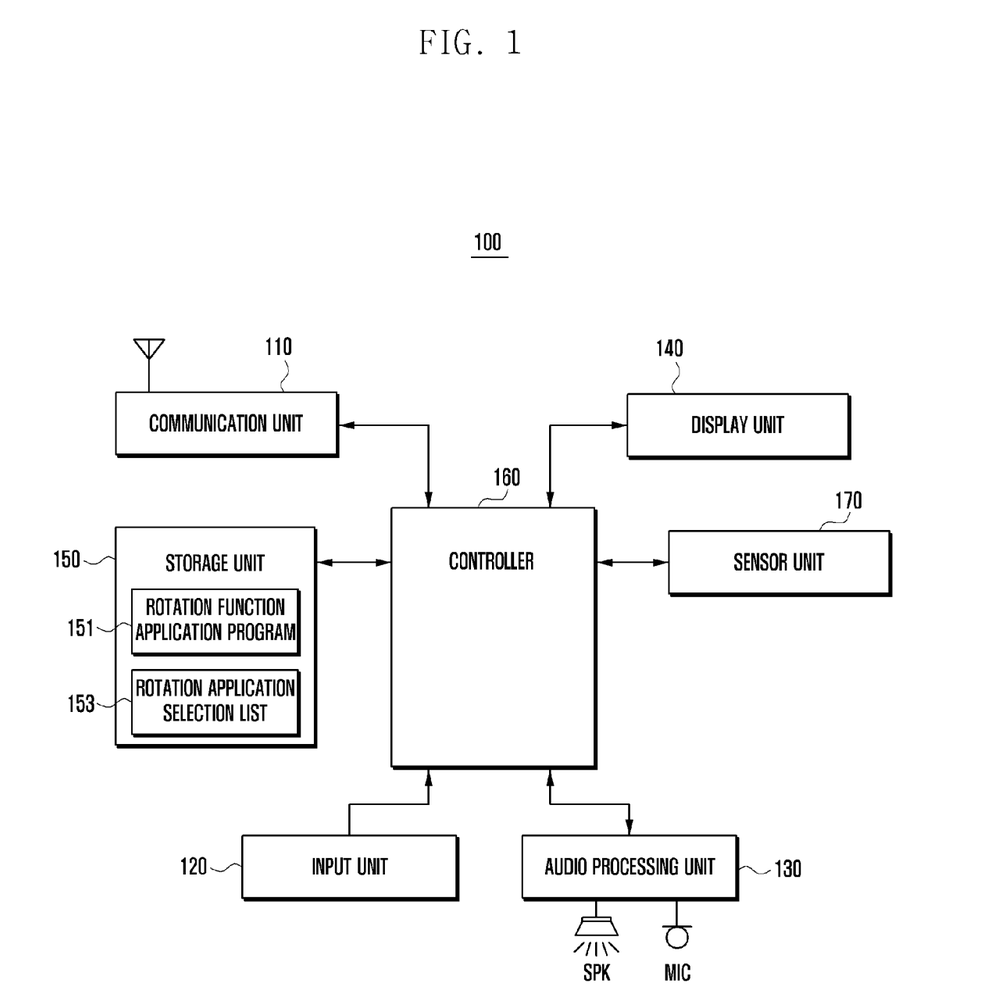
FIG. 1 is a view illustrating a schematic configuration of a terminal that supports a selective operation of a rotation function according to an exemplary embodiment of the present invention.

FIG. 1 is a view illustrating a schematic configuration of a terminal that supports a selective operation of a rotation function according to an exemplary embodiment of the present invention.

Referring now to FIG. 1, a terminal 100 of the present invention may include a communication unit 110, an input unit 120, an audio processing unit 130, a display unit 140, a storage unit 150, a sensor unit 170, and a controller 160.

The terminal 100 of the present invention having the above configuration can determine whether or not a user function of which activation is requested is included a list of selective operation of a rotation function, and when a corresponding user function is included in a selective operation list, the terminal 100 may control to activate the sensor unit 170 to collect sensor information. Also, the terminal 100 may determine direction information of the terminal according to the sensor information and may control to output a user function operation screen to which the rotation function applies according to a corresponding direction. The terminal 100 of the present invention may also selectively support the rotation function for available user functions of the terminal 100 such that the rotation function for a specific user function may be properly provided according to a user's intention or a terminal designer's intention, thereby performing the user function more adaptively.

The communication unit 110 comprises an element that supports a communication function of the terminal 100. Particularly, the communication unit 110 is an element that can be added when the terminal 100 is manufactured in a terminal that supports the communication function. Therefore, in the case that the terminal 100 to which the present invention may apply does not support the communication function, the communication unit 110 may be omitted from the configuration of the terminal 100. Meanwhile, the communication unit 110 may be provided in a mobile communication module so as to support the communication function, particularly a mobile communication function of the terminal 100. The communication unit 110 supports signal transmission and reception to perform the mobile communication function of the terminal 100 by forming a communication channel with a mobile communication system. For example, the communication unit 110 may form at least one of a voice service channel, a video service channel, and a data service channel with the mobile communication system and support transmission and reception of a specific signal according to a corresponding service channel.

With continued reference to FIG. 1, a screen according to activation of the communication unit 110 may be output on the display unit 140 in a certain direction. Here, a user function of supporting the communication unit 110 of the present invention may be a function of outputting the screen in only one direction on the display unit 140 according to a user setting. For example, when a user function based on the communication unit 110 is activated, the terminal 100 may provide only one of a vertical mode output screen or a horizontal mode output screen with respect to the user function related to the communication unit 110. When the user function that is related to the communication unit 110 is activated, the terminal 100 may control the sensor unit 170 to maintain an inactivation state according to the user setting. Also, the user function based on the communication unit 110 may have a different application of the rotation function according to a type thereof. In other words, in case of a voice call function or a video call function, the application of the rotation function may be interrupted, and in case of an email transmission function, the rotation function may apply. Accordingly, the user function that is related to the communication unit 110 of the present invention may be a function that selectively applies the rotation function according to the user setting or a designer's intent.

The input unit 120 generates various input signals needed to operate the terminal 100. The input unit 120 may be configured as various input items such as a keyboard, a key pad, or a key button depending on compatibility with the terminal 100. Also, when the display unit 140 is provided as a touch screen, the input unit 120 may be configured as a touch map outputted to the touch screen. Particularly, the input unit 120 of the present invention may generate an input signal according to a user request such as setting a specific user function as a rotation function application function or canceling setting of a user function that is set as the rotation function application function. Meanwhile, the input unit 120 of the present invention may include a touch pen that is separately provided and a digitizer that is a pen panel for applying the touch pen. An application control of the rotation function according to operating the input unit 120 will be described in more detail below with reference to the drawings.

The audio processing unit 130 includes hardware such as a processor so as to output, for example, various audio data set during a process of operating the terminal 100, an audio data according to reproducing an audio file stored in the storage unit 150, and an audio data received from an external. Also, the audio processing unit 130 may support an audio data collection function. To this end, the audio processing unit 130 may include a speaker SPK and a microphone MIC. Particularly, when operating the user function to which the rotation function applies, the audio processing unit 130 may output a corresponding effective sound when a screen direction is rotated according to a direction of the terminal 100. Also, the audio processing unit 130 may support to output an effective sound corresponding to a corresponding task when operating a specific user function, e.g., an effective sound corresponding to a writing task in case of a note function that is activated. The effective sound support may be omitted according to the user setting.

The display unit 140 provides various screens used for operating the terminal 100. For example, the display unit 140 supports, for example, a standby screen or a menu screen needed to operate the terminal 100. Particularly, the display unit 140 of the present invention may display a screen according to activation of a specific user function in a certain direction according to a setting of the rotation function and support to switch a direction of a corresponding screen according to the sensor information generated by the sensor unit 170 and the setting of the rotation function. Here, when the setting of the rotation function is turned off, the display unit 140 may support to maintain the display of a current screen direction even when the terminal 100 is rotated, for example, by a user turning it.

Specifically, the display unit 140 may output the screen according to the activation of the specific user function in a preset screen direction, e.g., in the vertical mode. Here, when the rotation function of a corresponding user function is set to be in a turn-off state, the display unit 140 may support to maintain the output screen in the vertical mode. The display unit 140 may also output the screen according to the activation of the specific user function in the horizontal mode and control to maintain the horizontal mode regardless of a rotation of the terminal 100 according to the setting of the rotation function.

In addition, when the rotation function of the specific user function is set to be in a turn-on state, the display unit 140 may output the screen according to a corresponding user function in a direction mode according to a current state of the terminal 100, for example, the vertical mode or the horizontal mode. Also, the display unit 140 may support output of the screen by changing a previous screen output mode or may maintain a current screen output mode according to the sensor information transmitted from the sensor unit 170.

The display unit 140 can provide a screen interface for setting a rotation application selection list 153 for determining whether or not to apply the rotation function to each user function and a menu item for calling the screen interface. When the screen interface is called by the user, the display unit 140 may provide a list of a user function to which the rotation function applies among the user functions provided by the terminal 100. Also, the display unit 140 may output the rotation application selection list 153 including items previously selected to apply the rotation function thereto by the user or the designer. The screen interface may be used to select the specific user function as a new user function to which the rotation function is to apply or support to cancel selection of the specific user function that is selected to apply the rotation function thereto, and may provide a renewal screen of the rotation application selection list 153 according to a corresponding operation result.

In addition, when a function of selectively applying the rotation function is provided as a default function with respect to the specific user function designated by a design method of the designer, a function of providing the screen interface for setting the rotation application selection list 153 may be removed. Also, when operating the specific user function designated according to the designer's intent, the terminal 100 may forcibly activate the sensor unit 170 which is turned off, and the display unit 140 may support to output a screen in which the collected sensor information is applied. In this process, the display unit 140 may display information about a list of the user function that is set as default.

The display unit 140 may be configured including the touch panel and the touch panel. Here, the touch panel may be configured in a form of a full touch screen by being formed to cover an entire surface of the display panel. The display panel may output a screen according to operation of the user function in a certain direction and may support to provide a horizontal mode screen or a vertical mode screen according to a selective operation of the rotation function of the present invention or support to maintain a particular mode screen. A touch event according to contact with the touch panel may be transmitted to the controller 160 with location information and touch degree or time information. The touch panel may be mapped with a screen element outputted on the display panel to select a particular element outputted on the screen.

The storage unit 150, which is a non-transitory machine readable medium, may store various basic operating systems utilized to operate the terminal 100, and, for example, a data or an application program and an algorithm corresponding to various user functions. Particularly, the storage unit 150 can store the rotation application selection list 153 and a rotation function application program 151 for selectively applying the rotation function of the present invention.

The rotation application selection list 153 includes a list of a user function to which the rotation function applies from among the user functions provided by the terminal 100 and a list of a user function for which selective operation of the rotation function is set among the list of the rotation function to which the rotation function can apply. In other words, the rotation application selection list 153 is a list set to forcibly activate the sensor unit 170 and apply the rotation function to a corresponding function based on corresponding sensor information even if the sensor unit 170 is set to the turn-off state so as not to apply the rotation function of the terminal 100. Alternatively, the rotation application selection list 153 may be a list of the user function for which the sensor information collected by the activated sensor unit 170 is selectively provided.

The rotation function application program 151 comprises machine readable code that may include a routine that when loaded into a processor determines a turn-on state or a turn-off state of the sensor unit 170 when the specific user function is activated, a routine for determining whether the specific user function is included in the rotation application selection list 153 by identifying the rotation application selection list 153 when the sensor unit 170 is in the turn off state, and a routine for forcibly activating the sensor unit 170 and collecting the sensor information when the specific user function is included in the rotation application selection list 153.

Also, the rotation function application program 151 may also include a routine that configures a processor or microprocessor for determining a direction of the terminal 100 according to the sensor information and a routine for controlling to operate the user function by adjusting a screen of the corresponding user function according to the direction of the terminal 100, or by applying a factor in accordance with the direction of the terminal 100 to the corresponding specific user function.

In addition, the rotation function application program 151 supports output to the screen interface which is described in the above together with the display unit 140. The screen interface may be an interface that supports the cancellation of items included in the rotation application selection list 153 or include new items in the corresponding list.

The sensor unit 170 is an element that collects the sensor information for supporting the rotation function of the terminal 100. The sensor unit 170 is configured as, for example, an accelerometer sensor and, when the terminal 100 is arranged in a particular direction or a direction change is generated when the terminal 100 is arranged in the particular direction, the sensor unit 170 generates the sensor information. The generated sensor information may be transmitted to the controller 160 to be used as a command for applying the rotation function of the terminal 100. Meanwhile, the sensor unit 170 may include not only the accelerometer sensor but also a geomagnetic sensor or a gyroscope sensor. Namely, the sensor unit 170 may preferably include at least one of various sensors described above to generate sensor information about at least one of a rotation state and a rotation direction of the terminal 100 to transmit the sensor information to the controller 160. The sensor unit 170 may maintain the turn off state according to the user setting, and in this case, the rotation function of the terminal 100 may not be provided by default except for exceptional application of the selected user function. When the sensor unit 170 is set to maintain the turn-on state, the user function to which the rotation function is designed to apply may be applied with the rotation function according to the sensor information of the sensor unit 170.

The controller 160 is an element for controlling various signal flow and collecting and outputting information needed to support the selective application of the rotation function according to an exemplary embodiment of the present invention. To this end, the controller 160 may include a configuration as shown in FIG. 2.

Figure 2:
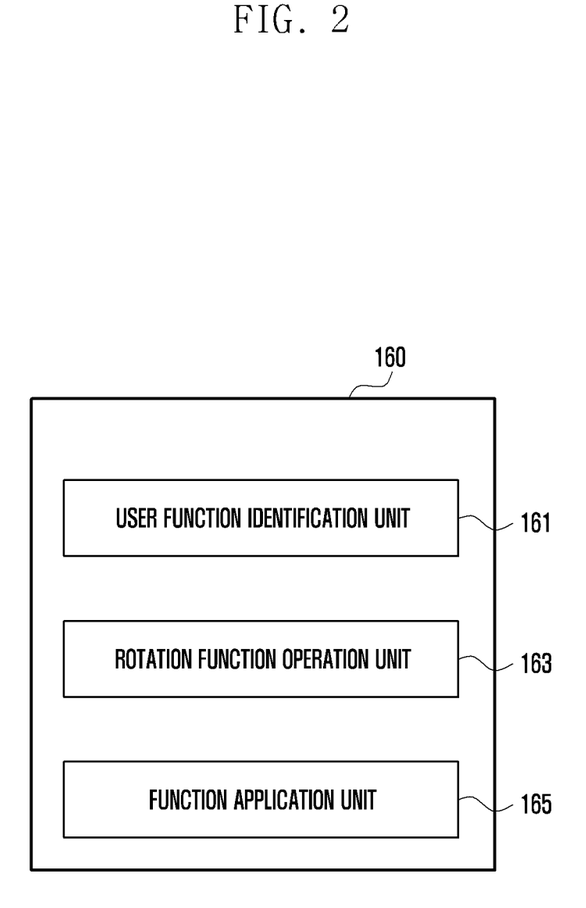
FIG. 2 is a view illustrating a detailed configuration of a controller of FIG. 1.

FIG. 2 is a view illustrating a detailed configuration of the controller 160 according to an exemplary embodiment of the present invention.

Referring now to FIG. 2, the controller 160, which comprises hardware including a processor or microprocessor of the present invention may include a user function identification unit 161, a rotation function operation unit 163, and a function application unit 165. These units may share hardware such as a microprocessor, and are not software per se.

The user function identification unit 161 identifies a characteristic of a corresponding user function when at least one of the input unit 120, the display unit 140 having a touch screen function, and predefined schedule information requests activating a specific user function. Namely, the user function identification unit 161 determines whether or not the user function of which activation is requested is a function to which the rotation function applies.

For example, if the specific user function is the function to which the rotation function applies, the user function identification unit 161 can determine the turn-on and turn-off states of the sensor unit 170. Here, when the sensor unit 170 is set to the turn-off state, the user function identification unit 161 may identify the rotation application selection list 153 stored in the storage unit 150. Also, when the user function of which activation is requested is included in the corresponding list, the corresponding information may be transmitted to the rotation function operation unit 163. Also, when the user function of which activation is requested is not included in the corresponding list, the user function identification unit 161 may transmit the corresponding information to the rotation function operation unit 163.

Figure 3:
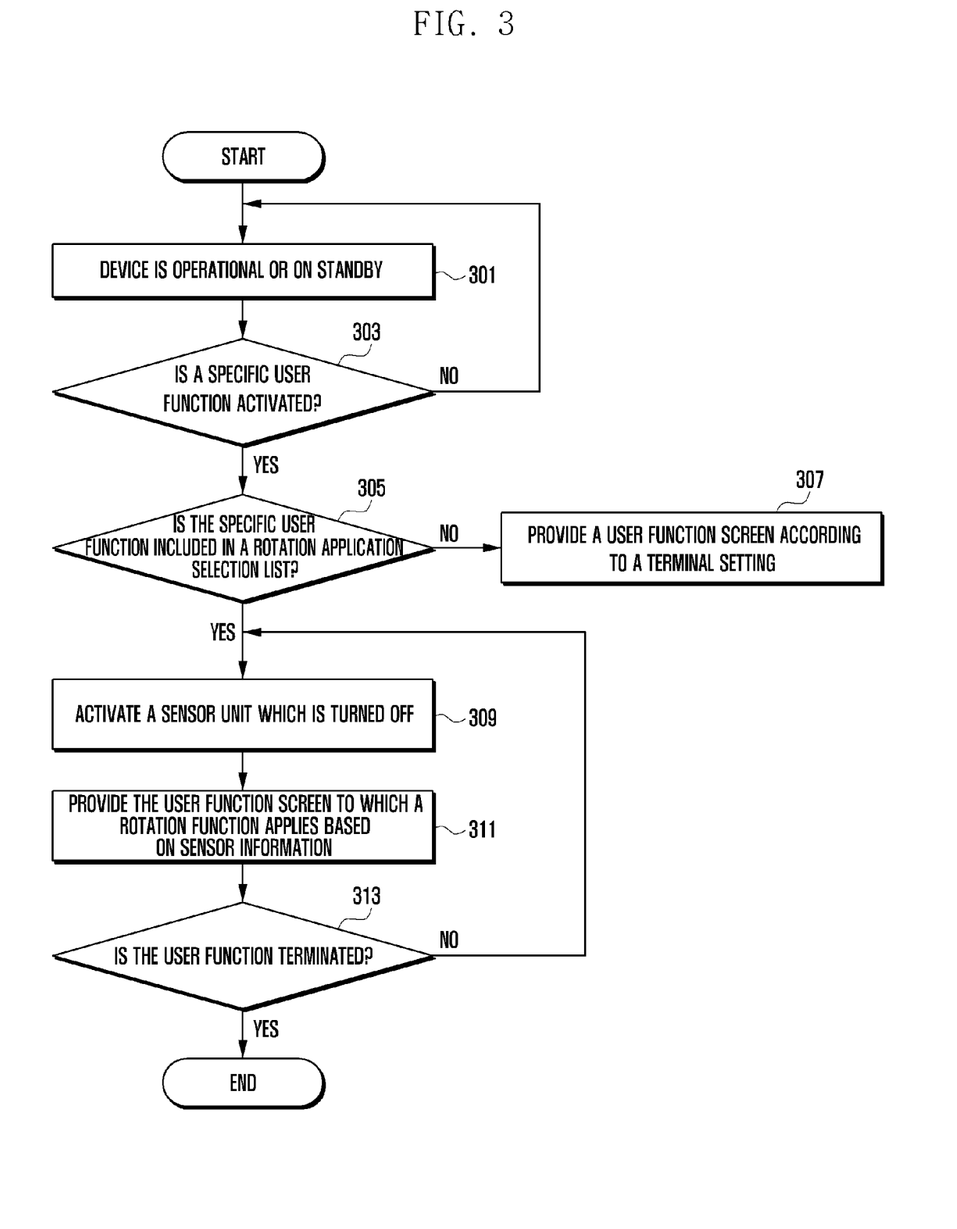
FIG. 3 is a flowchart illustrating a method of selectively operating a rotation function according to an exemplary embodiment of the present invention.

With continued reference to the controller 160 shown in FIG. 3, the user function identification unit 161 additionally supports a screen interface for renewing the rotation application selection list 153. Namely, the user function identification unit 161 supports an output of the screen interface on the display unit 140 according to a received input signal and may control removal a specific user function item included in the rotation application selection list 153 or the addition of a new user function item in the rotation application selection list 153 according to the input signal.

The rotation function operation unit 163 is an element that controls activation and inactivation of the sensor unit 170 and collects the sensor information from the activated sensor unit 170. When the sensor information has a value equal to or greater than a threshold value sufficient to generate rotation of the terminal 100, the rotation function operation unit 163 can provide this information to the function operation unit 165. Upon receiving information indicating that the user function of which activation is currently requested is included in the rotation application selection list 153, the rotation function operation unit 163 can control the forcible turn-on off the sensor unit 170 (which was in the turn-off state) to collect the sensor information. Also, the rotation function operation unit 163 can determine the rotation state of the terminal 100 according to corresponding sensor information and transmit a result thereof to the function application unit 165.

Upon receiving information indicating that the user function of which activation is currently requested is not included in the rotation application selection list 153, the rotation function operation unit 163 can control the sensor unit 170, which is in the turn-off state, to maintain being in the turn-off state thereof. Alternatively, even when the sensor information is collected by the sensor unit 170, which is in the turn-on state, the rotation function operation unit 163 may prevent transmission of the sensor information to the function application unit 165. A technology of selectively applying the rotation function of the present invention may be implemented by controlling to turn on the sensor unit 170, which is transitioned to the turn-off state, when operating the specific user function.

Also, a technology of selectively applying the rotation function of the present invention may be implemented by controlling a framework terminal so as not to transmit the sensor information from the sensor unit 170 to the specific user function according to a list of user functions for which the rotation function does not apply while maintaining the sensor unit 170 in the turn-on state.

Thus, according to a method of the rotation application selection list 153, the rotation function operation unit 163 can be configured so as to NOT transmit the sensor information to the function application unit 165 with respect to one or more user functions to which the rotation function does not apply and may also be configured so as to transmit the sensor information to the function application unit 165 with respect to the user functions to which the rotation function applies.

When the function application unit 165 receives the sensor information from the rotation function operation unit 163, the function application unit 165 can support switching the screen of the user function based on the corresponding sensor information or control to operate the user function according to the sensor information.

For example, in a case where the function application unit 165 receives the sensor information, the function application unit 165 can be configured to switch a current screen state. Namely, the function application unit 165 may control a change from the horizontal mode screen into the vertical mode screen, or a change from the vertical mode screen into the horizontal mode screen.

Also, the function application unit 165 of the present invention can control operation of the user function according to a mode change. For example, the function application unit 165 may control a screen ratio according to the mode switch or control a type of information or an amount of information of a screen to be output or a screen ratio. Also, the function application unit 165 may provide a change of a screen output to the screen according to the mode change. For example, when the horizontal mode is changed to the vertical mode, the function application unit 165 may support to output a different type, size, or arrangement of a keyboard that is outputted to the screen, and also may support to output a character inputted by a corresponding keyboard in a different output pattern. Further, as described below, the function application unit 165 may support application a different error correction of a touch pen according to the mode change.

As described above, the terminal 100 which supports the selective operation of the rotation function according to an exemplary embodiment of the present invention is configured to provide the selective application of the rotation function among the user functions the terminal 100 can provide, thereby meeting subdivided requirements of each user. Also, with respect to the function to which the rotation function applies, or does not apply, the terminal 100 of the present invention supports dividing the user function into two functions, in which in one function the rotation function applies as default regardless of the user setting according to the designer's design intent, and a user function of which setting can be changed according to the user's request. Accordingly, the present invention may support to implement a mobile terminal that meets requirements of both a developer of the user function and the user. Also, as described below, in case of changing the setting according to the user's request, the present invention can support enabling the setting application or non-application of the rotation function more easily and conveniently.

With regard to the above, the configuration of the terminal 100 which supports selective application of the rotation function according to an exemplary embodiment of the present invention has been described. Hereinafter, a method of selectively applying the rotation function of the present invention will now be described.

FIG. 3 is a flowchart illustrating a method of selectively operating a rotation function that supports the selective operation of a rotation function according to an exemplary embodiment of the present invention.

Referring now to FIG. 3, in a rotation function selective operation method of the present invention power is supplied or has previously been supplied to the terminal 100 so that the terminal is at least operational or on standby (301). When the power is supplied, the controller 160 can control the distribution of the supplied power to each element of the terminal 100. Accordingly, each item of the terminal 100 can perform an initialization process. When the initialization process is completed, the controller 160 can be configured to control to operate the specific function according to the predefined schedule information or operate the standby screen.

Next, at (303) the controller 160 determines whether or not an input signal for activating the specific user function is generated from the input unit 120 or the display unit 140 having the touch screen function.

The user may generate the input signal for activating the specific user function provided by the terminal 100 by using at least one of the input unit 120 and the display unit 140. For example, the user may generate an input signal for activating an icon provided for activating the specific user function or a menu item. Meanwhile, when the input signal for activating the specific user function is not generated at step 303, the terminal 100 proceeds to a preceding stage of step 301 to re-perform a subsequent step until the input signal for terminating the terminal 100 is generated.

Meanwhile, when the input signal for activating the specific user function is generated at step 303, then at (305) the controller 160 determines whether the corresponding user function is included in the rotation application selection list 153. To this end, the controller 160 may compare the rotation application selection list 153 stored in the storage unit 150 with information of the user function of which activation is requested.

Here, when the user function of which activation is requested is not included in the rotation application selection list 153, at (307) the controller 160 supports the activation of the corresponding user function and control screen application according to a terminal setting. In other words, when the sensor unit 170 is set to be turned off, the controller 160 may control not to apply a screen mode switch according to a turn off setting of the sensor unit 170 even when the rotation state of the terminal 100 has been changed.

When at step (305) the controller determines that the user function of which activation is requested is included in the rotation application selection list 153, the controller 160 controls activation of the sensor unit 170, in which the sensor is in the turn-off state to support the rotation function (the sensor unit is turned on, enabled, etc.). Subsequently, at (S311), the controller 160 can perform the corresponding user function by applying the rotation function based on the sensor information transmitted to the sensor unit 170.

Next, at (S313) the controller 160 determines whether or not an input signal for terminating the corresponding user function is generated, and when the input signal for terminating the user function is generated at step 313, the controller 160 supports termination of the user function, and when the input signal for terminating the function is not generated, the controller 160 proceeds to a preceding stage of step 309 to re-perform a subsequent step.

Meanwhile, the above method, an example of operating the user function included in the rotation application selection list 153 according to application of the rotation function is described; however, the user function included in the rotation application selection list 153 can be controlled to operate according to the non-application of the rotation function. More specifically, when the sensor unit 170 maintains the turn-on state and the input signal for activating the specific user function included in the rotation application selection list 153 is generated, the controller 160 does not apply the rotation function regardless of the rotation of the terminal 100 when operating the corresponding user function. In other words, the controller 160 may disable the sensor unit 170, or refrain from activating the sensor unit 170.

As described above, a function of selective application of the rotation function according to an exemplary embodiment of the present invention supports determining whether or not to apply the rotation function per each user function, and in a case where the designer sets to apply the rotation function to the specific user function as default, even when the sensor unit 170 for supporting the rotation function is turned off, the corresponding sensor unit 170 can be turned on to apply the rotation function.

Figure 4:
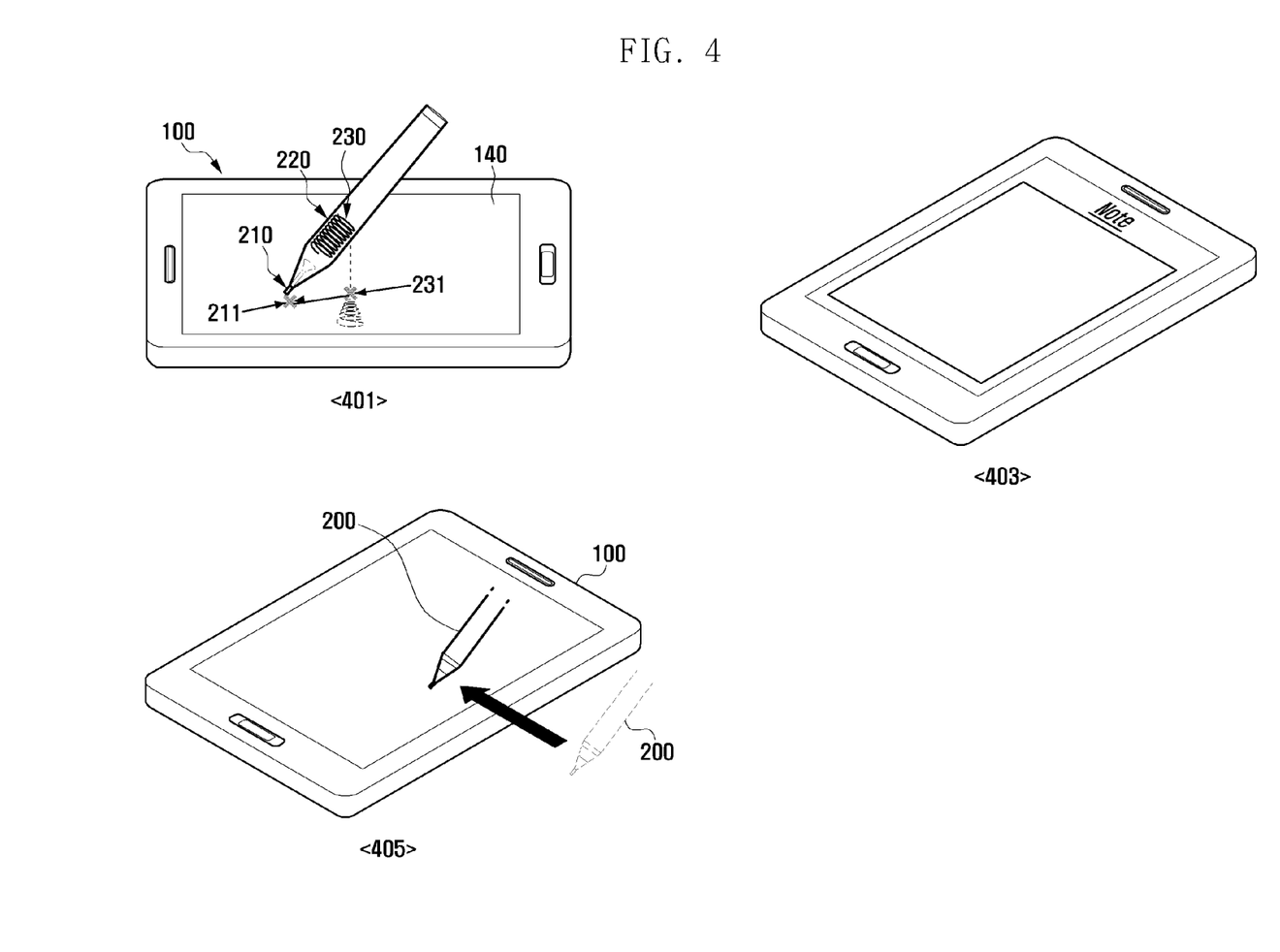
FIG. 4 is an illustrative example of applying a selective operation of a rotation function according to the present invention.

FIG. 4 is a view illustrating an example of applying a selective operation of a rotation function of the present invention.

Referring now to FIG. 4, the example of applying the selective operation of the rotation function of the present invention may include the terminal 100 and the touch pen 200.

Here, the touch pen 200 is a pen that supports an electrostatic induction method and includes a penholder 220 and a nib 210, wherein a coil 230 for the electrostatic induction method can be arranged in the penholder 220 at an area adjacent to the nib 210. Also, in the terminal 100, the pen panel in which an electromagnetic field is formed by the coil 230 may be disposed in a certain location, for example, a lower portion of a location in which the touch panel and the display panel are arranged. The pen panel determines where the touch pen 200 points based on the electromagnetic field are formed when the touch pen 200 approaches within a predetermined distance.

Meanwhile, when the touch pen 200 is used to perform a writing task on the display unit 140, the writing task is performed by tilting the touch pen 200 at a predetermined angle. Accordingly, in a process of performing a task, e.g., an actual writing, the touch pen 200 of the present invention can be provided such that a point 211 contacted by the nib 210 and a point 231 at which the electromagnetic field is formed by the coil 230 are separated from each other at a predetermined interval, as shown in screen 401.

In a pen mode using the touch pen 200, the mobile terminal 100 may compensate for an error between the contact point 211 of the nib 210 and the point 231 at which the electromagnetic field is formed. More particularly, in a process of supporting the horizontal mode and the vertical mode of the display unit 140, respectively, the terminal 100 can support by providing a compensation value in the horizontal mode that is different from a compensation value in the vertical mode. A reason for such application of the different compensation value is because a screen ratio in the horizontal mode is different from a screen ratio in the vertical mode, and as a result, different compensation values are used for applying each screen mode in order for the compensation value to be used with respect to a distance from the point 231 at which the electromagnetic field is formed by the coil 230 to the point 211 contacted by the nib 210.

Meanwhile, when the user sets the device so as not to apply the rotation function, the terminal 100 of the present invention may maintain the sensor unit 170 in the turn-off state. Here, when the user function for operating the touch pen 200 is activated, or the touch pen 200 approaches within a predetermined distance from the terminal 100, the terminal 100 of the present invention can support application of the rotation function based on the sensor unit 170.

Specifically, as shown in screen 403, when a note function that is a user function based on the touch pen 200, or a screen for activating a memo function is provided, the controller 160 can control the activation of the sensor unit 170 which is turned off. Also, the controller 160 of the terminal 100 can determine the rotation direction of the terminal 100 based on the sensor information collected by the sensor unit 170 and, based thereon, can control application of the compensation value of the touch pen 200. In other words, the controller 160 can identify a horizontal mode or vertical mode arrangement of the terminal 100 and control application of the compensation value according to the corresponding mode.

As shown in screen 405, when the touch pen 200 approaches within a certain predetermined distance from the terminal 100, the terminal 100 may detect formation of the electromagnetic field by the coil provided on the touch pen 200. When the formation of the electromagnetic field is detected, the terminal 100 controls activation of the sensor unit 170 in the turn off state and may identify the rotation state of the terminal 100 based on the collected sensor information. Also, the controller 160 may support application of the compensation value of the touch pen 200 that matches with the corresponding vertical mode or horizontal mode according to the rotation state of the terminal 100.

Figure 5:
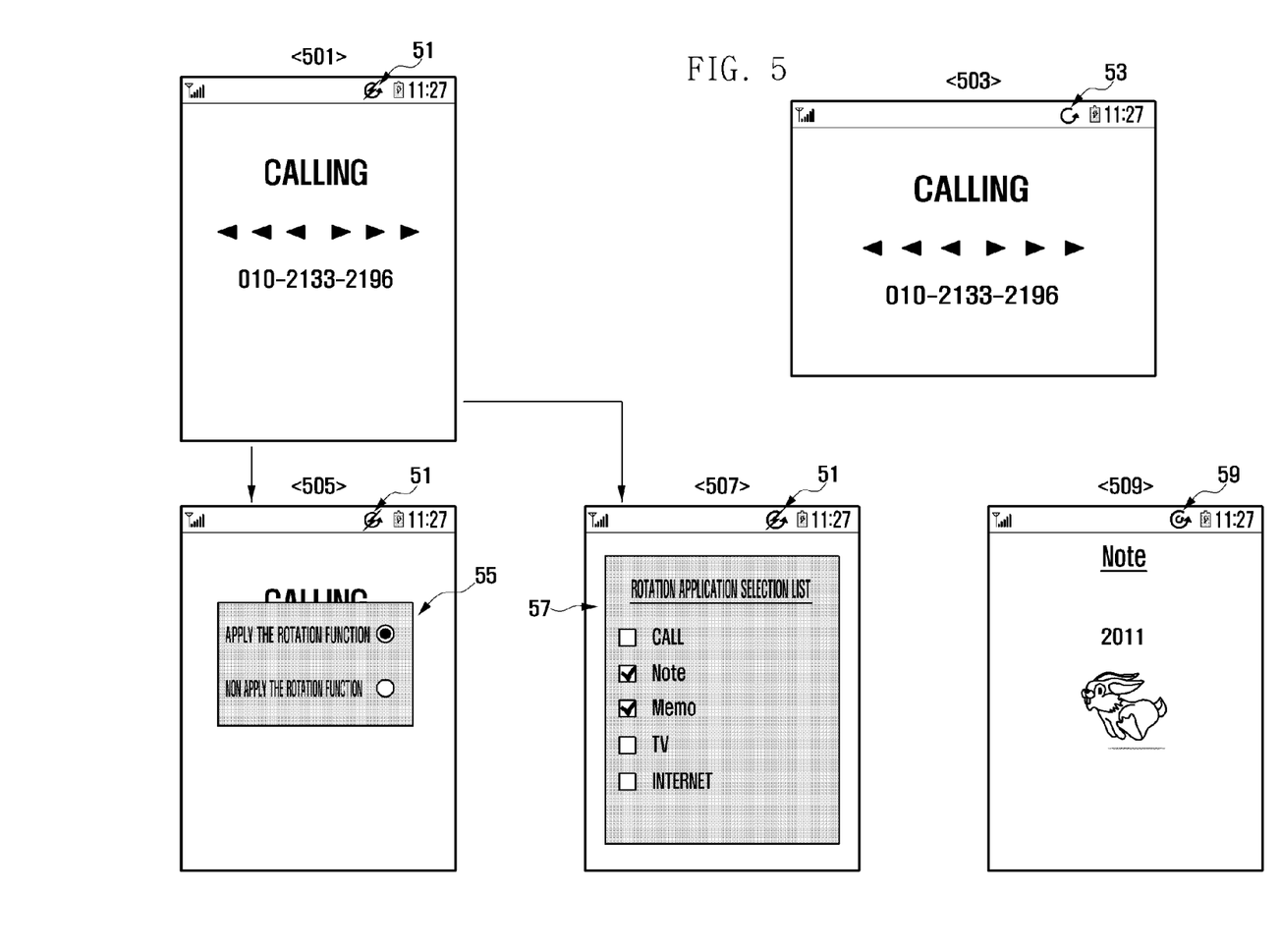
FIG. 5 is an illustrative example of processing a screen of a terminal when selectively operating a rotation function according to the present invention.

FIG. 5 is an illustrative example of processing a screen display associated with a function of selectively applying a rotation function according to an exemplary embodiment of the present invention.

Referring now to FIG. 5, as shown in screen 501, the terminal 100 may output an icon 51 according to a non-application state of the rotation function on one side of the screen, for example, an indicator area. The user may identify the non-application state of the rotation function through the rotation function non-application state icon 51. The rotation function non-application state icon 51 may be selected by the user, and upon selection, the controller 160 may support to change to a rotation related function of the currently activated user function to a rotation function application state, similar to a toggle method as shown in screen 503. Here, the controller 160 may support to output a change icon 53 according to the switched rotation function application state. The change icon 53 may be an icon that indicates that the corresponding user function is switched to the rotation function application state or that the corresponding user function is the user function which is in the rotation function application state. When the change icon 53 is selected, the rotation function application of the corresponding user function is changed to the non-application state, and accordingly, the rotation function non-application state icon 51 may be output as shown in screen 501. The two icons as shown in the example provide at glance information regarding the rotational application or non-application-state.

Alternatively, as shown in screen 505, the controller 160 may output a selection window 55 in which application or non-application of the rotation function may be selected, as shown in screen 505. Alternatively, as shown in screen 507, the controller 160 may support output of a rotation application selection list window 57 on the display unit 140. Accordingly, the user may easily set application or non-application of the rotation function through the rotation function non-application state icon 51 and the change icon 53 described above, and application per user may be easily set.

Even in the rotation function non-application state, when the user function of a currently activated state is a user function that requires application of the rotation function, the controller 160 of the present invention may support to output a corresponding forcible icon 59 to the display unit 140, as shown in screen 509 to enable the rotation function. In the above description, respective icons may be continuously output to a predetermined area during when a corresponding user function is activated. However, the present invention is not limited thereto, and the controller 160 may temporarily output, for example, a popup window on the screen instead of outputting an icon, thereby providing a notice or a corresponding image indicating the rotation function application state or the rotation function non-application state of the corresponding user function.

As described above, even in the case where a screen rotation function is turned off, when the user function that requires application of the rotation function is activated, the framework of the terminal 100 may selectively collect and transmit terminal direction information to allow for appropriate correction and other related work.

The terminal 100 according to the present invention may selectively further include various additional modules according to a form in which the terminal 100 is provided. In other words, the terminal 100 may further include items not expressly described herein, for example, a short range communication module for short range communication, an interface for transmitting and receiving a data by a wire communication method or a wireless communication method of the terminal 100, an Internet communication module for performing an internet function by communicating with an internet network, and a digital broadcast module for performing to receive and reproduce a digital broadcast. With the convergence of digital devices, there may be many digital devices and modifications thereof, not listed in the application, and, it will be appreciated that elements equivalent to the level of the forgoing elements can also be included in the terminal 100. Also, a person of ordinary skill in the art should appreciate that a specific element can be omitted or replaced by another element in the above configuration according to the form in which the terminal 100 is provided. The above should be easily appreciated by a person of ordinary skill in the art.

The terminal 100 according to an exemplary embodiment of the present invention may include all mobile communication terminals that operate based on communication protocols corresponding to various communication systems as well as all information technology devices, multimedia devices and their associated application devices, such as a portable multimedia player (PMP), a digital broadcasting player, a personal digital assistant (PDA), a music reproducing device (for example, an MP3 player), a mobile game terminal, a smart phone, a laptop, and a handheld personal computer (PC), just to name a few non-limiting possibilities.

As described above, in a method of selectively operating a rotation function and a terminal supporting the same according to the present invention, the present invention may selectively operate the rotation function such that a terminal operation according to a user request may be supported while processing a user function may be performed based on the rotation function as needed, thereby removing inconvenience in controlling a terminal by a user and supporting more adaptive operation of the user function.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Under the broadest reasonable interpretation, the appended claims constitute statutory subject matter in compliance with 35 U.S.C. §101.

The terms "unit" or "module" as used herein is to be understood as constituting hardware such as a processor or microprocessor configured for a certain desired functionality in accordance with statutory subject matter under 35 U.S.C. §101 and does not constitute software per se.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of selectively operating a rotation function of a display of an electronic device comprising a sensor, the method comprising:
   generating a rotation application selection list comprising at least one user function;
   executing a user function according to an input means;
   determining whether the executed user function is listed in the rotation application selection list; and
   turning on the rotation function for the at least one user function in a state in which the rotation function for the electronic device is turned off if the executed user function is listed in the rotation application selection list.

2. The method of claim 1, further comprising:
   detecting the rotational direction of the electronic device by using the sensor; and
   rotating an orientation of the display of the executed user function according to the detected rotational direction.

3. The method of claim 2, further comprising at least one of:
   removing the user function listed in the rotation application selection list; or
   adding the user function in the rotation application selection list.

4. The method of claim 3, wherein the removing or adding of the user function is a performed in response to the input means.

5. The method of claim 2, wherein the detecting the rotational direction of the electronic device comprises:
   collecting sensor information by the sensor which is turned on; and
   determining at least one of a rotation state and the rotation direction of the electronic device based on the collected sensor information.

6. The method of claim 2, wherein rotating an orientation of the display of the executed user function comprises:
   outputting the orientation of the display of the executed user function as a horizontal mode or a vertical mode.

7. The method of claim 1, wherein executing the user function according to an input means comprises:
   executing a note or memo function based on at least one of a touch pen according to an electrostatic induction method, and a pen panel and a touch panel which are provided for supporting the touch pen.

8. The method of claim 7, wherein turning on the rotation function for the at least one user function in a state in which the rotation function for the electronic device is turned off comprises:
   turning on the rotation function for the at least one user function when the touch pen approaches within a predetermined distance from the pen panel such that an electromagnetic field is formed on the pen panel;
   collecting sensor information by the sensor which is turned on for the at least one user function; and
   determining at least one of a rotation state and the rotational direction of the electronic device based on the collected sensor information.

9. The method of claim 8, further comprising:
   determining a horizontal mode direction or a vertical mode direction according to the rotation state and the rotational direction of the electronic device; and
   applying a different compensation value with respect to a distance to the touch pen according, to the horizontal mode direction or the vertical mode direction.

10. The method of claim 1, further comprising:
    outputting at least one of an icon indicating a rotation function application state, an icon indicating a rotation function non-application state, and a forcible icon indicating the user function which supports to apply the rotation function in the rotation function non-application state by forcibly turning on the sensor to collect sensor information.

11. The method of claim 1, further comprising:
    outputting a selection window for selecting rotation function application or rotation function non-application with respect to the user function.

12. An electronic device for supporting selective operation of a rotation function, the electronic device comprising:
    a display;
    a storage unit configured to store a rotation application selection list;
    a sensor configured to collect sensor information for supporting the rotation function; and
    a controller configured to:
      generate the rotation application selection list comprising at least one user function,
      execute a user function according to an input means,
      determine whether the executed user function is listed in the rotation application selection list, and
      turn on the rotation function for the at least one user function in a state in which the rotation function for the electronic device turned off if the executed user function is listed in the rotation application selection list.

13. The electronic device of claim 12, wherein the controller is further configured to:
  detect a rotational direction of the electronic device by using the sensor; and
  rotate an orientation of the display of the executed user function according to the detected rotational direction.

14. The electronic device of claim 13, wherein the controller is further configured to:
  remove the user function listed in the rotation application selection list, or
  add the user function in the rotation application selection list.

15. The electronic device of claim 13, wherein the display is further configured to output the orientation of the display of the executed user function according to the rotational direction of the electronic device in a horizontal mode or a vertical mode.

16. The electronic device of claim 12, wherein the display is configured to:
  output at least one of an icon indicating a rotation function application state, an icon indicating a rotation function non-application state, and a forcible icon indicating the user function which supports to apply the rotation function in the rotation function non-application state by forcibly turning on the sensor to collect the sensor information.

17. The electronic device of claim 12, wherein the display is configured to:
  output a selection window for selecting a rotation function application or a rotation function non-application with respect to the user function.

18. The electronic device of claim 12, wherein the controller is further configured to:
  execute a note or memo function based on at least one of a touch pen according to an electrostatic induction method, and a pen panel and a touch panel which are provided for supporting the touch pen.

19. The electronic device of claim 18, wherein the controller is configured to determine a horizontal mode direction or a vertical mode direction according to a rotation state and a rotational direction of the electronic device and configured to apply a different compensation value with respect to a distance to the touch pen according to the horizontal mode or the vertical mode direction.

\* \* \* \* \*